United States Patent [19]

Rau

[11] 4,329,165

[45] May 11, 1982

[54] METHOD FOR ENHANCED MELTING OF GLASS BATCH AND APPARATUS THEREFOR

[75] Inventor: Frederick C. Rau, McMurray, Pa.

[73] Assignee: PPG Industries, Inc., Pittsburgh, Pa.

[21] Appl. No.: 236,161

[22] Filed: Feb. 26, 1981

[51] Int. Cl.³ ............................................. C03B 3/00
[52] U.S. Cl. ....................................... 65/134; 65/27; 65/135; 65/335
[58] Field of Search .................... 65/135, 27, 335, 134

[56] References Cited

U.S. PATENT DOCUMENTS

| | | | |
|---|---|---|---|
| 1,916,262 | 7/1933 | Good. | |
| 2,214,191 | 9/1940 | Batchell et al. | 49/63 |
| 2,294,373 | 9/1942 | Batchell | 65/121 |
| 2,327,887 | 8/1943 | Halbach et al. | 49/54 |
| 2,533,826 | 12/1950 | Lyle | 49/54 |
| 2,578,110 | 12/1951 | Tooley | 49/77 |
| 2,749,666 | 6/1956 | Baque | 49/77 |
| 2,829,784 | 5/1958 | Henry et al. | 214/18 |
| 3,127,033 | 3/1964 | Lyle | 214/18 |
| 3,193,119 | 7/1965 | Blaine | 214/23 |
| 3,233,022 | 2/1966 | Henry et al. | 264/123 |
| 3,325,268 | 6/1967 | Penberthy | 65/134 |
| 3,637,365 | 1/1972 | Oulton | 65/134 |
| 3,780,889 | 12/1973 | Frazier et al. | 214/33 |
| 3,896,201 | 7/1975 | Mabru | 264/118 |
| 3,994,710 | 11/1976 | Schwenninger | 65/135 |
| 4,004,903 | 1/1977 | Daman et al. | 65/135 |
| 4,023,976 | 5/1977 | Bauer et al. | 106/52 |
| 4,030,905 | 6/1977 | Hawkins | 65/135 |
| 4,282,023 | 8/1981 | Hammel et al. | 65/135 X |

Primary Examiner—Arthur D. Kellogg
Attorney, Agent, or Firm—Irwin M. Stein

[57] ABSTRACT

The rate at which glass batch is melted to a liquid state is improved by providing a series of depressions having sloped surfaces in the glass batch at the charging end of the furnace. The sloped surfaces of the depression permit run-off of melted glass batch, thereby exposing the surface of fresh glass batch to the heat of the furnace. Depressions in the glass batch are made by projecting periodically a plurality of horizontally spaced independently suspended and independently operable tapered pothole-producing members into the glass batch material and pushing the glass batch beneath the tapered member into the below the surface of the molten glass a distance about equal to the height of the glass batch blanket. The action of the tapered member in producing the depression also provides a wave action to the body of molten glass in the vicinity of the charging end of the furnace, which enhances the rate of melting of glass batch materials. Better coverage of the glass batch on the surface of the molten glass is also observed.

11 Claims, 6 Drawing Figures

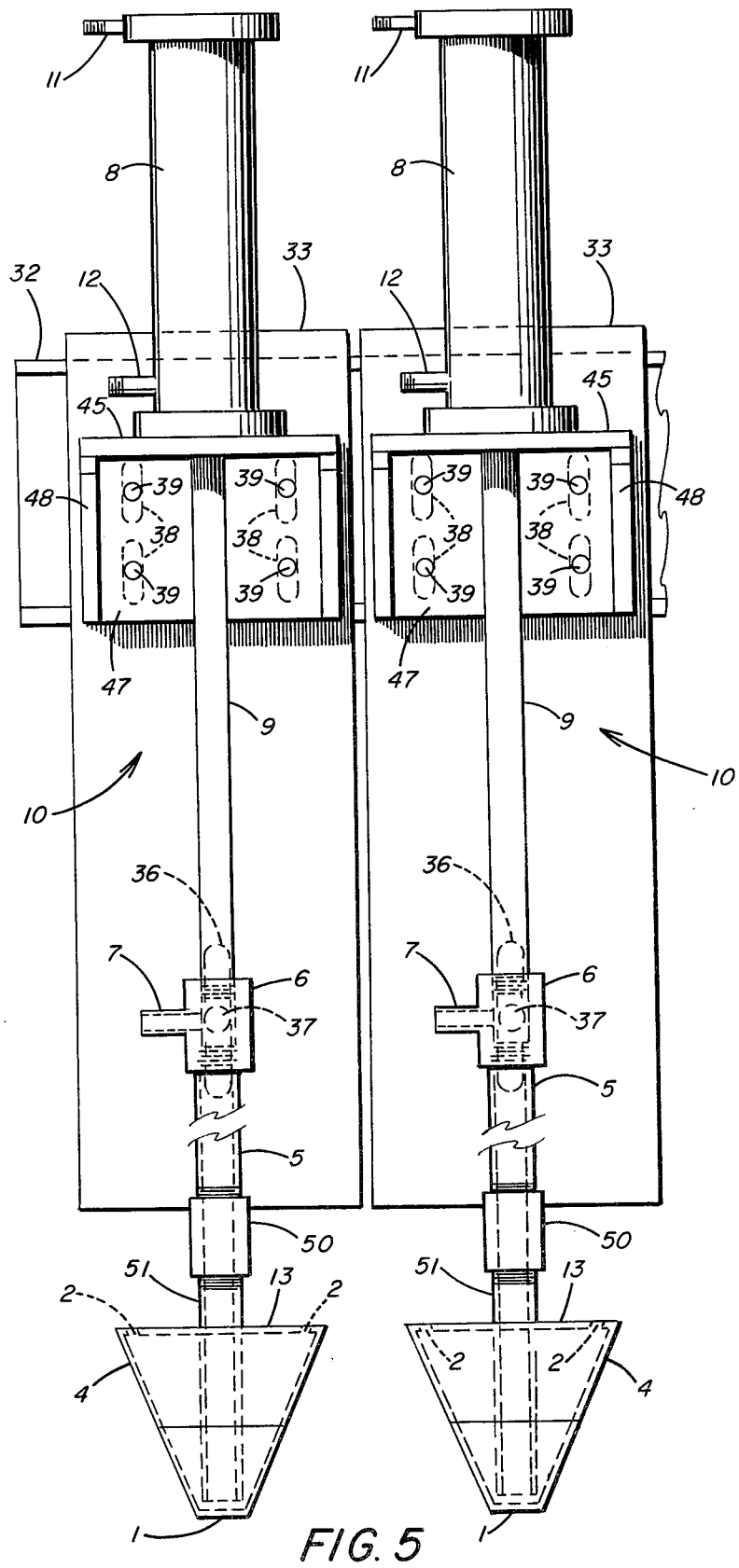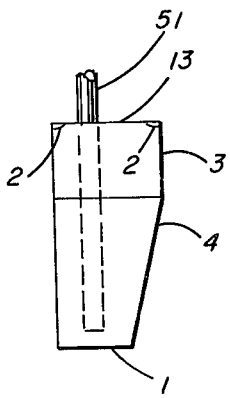
FIG. 2
FIG. 3
FIG. 5

METHOD FOR ENHANCED MELTING OF GLASS BATCH AND APPARATUS THEREFOR

CROSS-REFERENCE TO RELATED APPLICATIONS

This application is related to U.S. Patent Application Ser. No. 155,802, filed June 2, 1980 in the name of Joseph J. Hammel, entitled "Method of Improving Glass Melting by Ablation Enhancement," and U.S. Patent Application Ser. No. 159,528, filed June 16, 1980 in the names of Edward P. Savolskis and Walter W. Scott, entitled "Apparatus for Improving Glass Melting by Perforating Batch Layer."

DESCRIPTION OF THE INVENTION

This invention relates to a method and apparatus for improving the rate of melting glass batch in a tank-type melting furnace whereby the output of a particular furnace may be increased at a given energy consumption or, conversely, the energy consumption may be reduced for a given throughput. More particularly, this invention relates to modifying the surface texture of the blanket of glass batch materials introduced into the melting zone of a glass melting furnace so as to enhance the rate at which the raw ingredients are brought to a liquid state.

In a typical glass melting furnace of the regenerative or recuperative type, a body of molten glass is maintained in the furnace and raw glass batch materials are fed through an inlet at one end of the furnace onto the surface of the pool of molten glass. The batch materials form an unmelted layer or blanket at the inlet end which floats on the surface of the molten glass pool. The blanket melts slowly as it moves through the furnace and may extend a considerable distance into the furnace before it melts completely. Molten glass substantially free of unmelted glass batch is withdrawn from the opposite end of the furnace through a suitable exit port.

It has been recognized that unmelted glass batch is a thermal insulator which inhibits the rate at which the glass batch is heated to its liquidus temperature. Therefore, liquefaction of glass batch usually is limited to a relatively thin layer at the surfaces of the batch blanket in contact with the molten glass or heat source of the furnace. In order to overcome this problem, attempts have been made in the past to increase the surface area of the batch blanket exposed to the heat source above it in the furnace. For example, U.S. Pat. No. 4,030,905 shows an arrangement for plowing furrows transversely across a batch blanket. Such an arrangement may produce an increase in batch surface area and some slight improvement in run-off of melted batch, but possesses certain drawbacks. Plowing the furrows causes batch to be piled up more deeply on either side of each furrow, thereby further insulating the underlying batch from the overhead source of heat. Furthermore, any enhancement in run-off by plowing is limited because the furrows do not extend to the underlying molten glass and because some of the loose batch material tends to fall back into the furrow behind the plow.

Another approach to breaking up a batch blanket is disclosed in U.S. Pat. No. 3,994,710 wherein an inverted T-shaped member is employed to chop the batch blanket into pieces. Such an arrangement appears most suitable for a location relatively far into the furnace where melting of the batch blanket has already progressed to an advanced stage. It is, however, desirable to improve run-off as early as possible in the melting process. Additionally, by being located within the main body of the melting furnace, the T-shaped member of the patent requires substantial cooling, which detracts from any net thermal gains. Also, operating on the batch blanket within the main body of the furnace carries with it the risk of increased carry-over of materials which can have an adverse effect on the walls and regenerator or recuperator system of the furnace.

Another prior art approach has been to bring the batch ingredients into more intimate contact with the molten glass, such as in U.S. Pat. Nos. 2,533,826 and 2,749,666. The object of this approach is to take advantage of conductive heat from the molten glass, but it has now been found that the major source of heat (typically about seventy percent) for melting the batch is the overhead radiant heat from the heat source, e.g., combustion flames, in the furnace. Therefore, covering the batch with molten glass can be disadvantageous in that it reduces the amount of radiant heat received by the batch. It is desirable to increase rather than decrease the impingement of radiant energy on the batch materials.

Other attempts have been made to improve batch melting by reducing the thickness of the batch blanket, such as in U.S. Pat. Nos. 2,327,887; 3,193,119; and 4,004,903. While reducing batch blanket thickness may generally be desirable, the approach in each of these patents has the drawback of reducing surface area exposed to overhead radiant heat and inhibiting run-off of melted batch. Furthermore, in many commercial glass melting operations, a primary objective is to maximize throughput of a given furnace. In such a case, the batch blanket would already cover a maximum area and any reduction in batch blanket thickness would undesirably reduce the throughput of the furnace. The last-mentioned patent overcomes this dilemma somewhat by compacting the batch blanket; but, nevertheless, a flat upper surface is the result.

It is also known to produce a plurality of discrete batch piles by employing a plurality of small batch feeders, such as in U.S. Pat. No. 3,127,033. Such an approach appears to be quite limited as to throughput because of the small size of the inlets through which batch is fed.

Two types of batch feeders are in widespread commercial use in the glass industry, the first being the reciprocating tray type, as shown in U.S. Pat. Nos. 1,916,262 and 3,780,889, and the second being the rotary type, as shown in U.S. Pat. No. 2,829,784. The reciprocating tray type feeder may inherently form a series of ridges extending laterally across the batch blanket. However, these ridges are not as steep as would be desired for the sake of enhancing run-off nor do the furrows between the ridges provide a sufficiently free path for run-off. After melting of the batch blanket has progressed substantially, the ridges typically become separated into floating masses known as "logs." However, break-up of the batch blanket does not occur as early as would be desired. The rotary type feeder produces a nearly level batch blanket with only a shallow treadmark on the surface produced by the rotary feeder blades. Hence, the rotary type feeder is particularly characterized by poor run-off.

While the above-described prior art appears to recognize some advantages for increasing the surface area of the batch blanket and for minimizing the thickness of the batch layer, these improvements have heretofore been implemented in embodiments which favor one of the improvements to the exclusion of the other. Furthermore, it appears that the aforesaid prior art has not fully appreciated nor used the advantages attendant to enhancing run-off of melted glass batch material from a batch blanket.

In the above-referenced U.S. Pat. Applications Ser. Nos. 155,802 and 159,528, there are described methods and apparatus for improving the melting of glass batch by providing tapered holes in the glass batch at its point of introduction onto the body of molten glass by a plurality of horizontally spaced hole-producing tapered members attached to a common rigid beam extending across the width of the inlet extension of the furnace. In the embodiments described in the aforesaid applications, the hole-producing tapered members are lowered uniformly into the glass batch by lowering the beam to which the members are attached. The apparatus is designed to penetrate only through the thickness of the batch or slightly below the bottom of the batch layer.

In practice, the distribution of glass batch onto the body of molten glass is not always uniform across the total width of the batch feeder apparatus. This is especially true for reciprocating tray-type batch feeders where thickness of the batch material can be more shallow at the sides of the reciprocating tray feeder than at its middle section. Consequently, hole-producing tapered members lowered into a more shallow portion of the batch can come into contact with molten glass which adheres to the bottom portion of such members. The buildup of solidified glass on the bottom of such members will eventually disrupt operation of the hole-producing apparatus.

It has now been found that the aforesaid disadvantage can be overcome by providing vertically adjustable independent mounting means for each hole-producing tapered member at its point of attachment to a rigid supporting member disposed across the width of the inlet extension of the furnace; and, independent vertical reciprocal stroking means for the hole-producing tapered members. In this embodiment, the stroke length of each hole-producing tapered member can be regulated so that the bottom portion of the member will not come into contact with the body of molten glass regardless of the thickness of glass batch material to be penetrated. Thus, the stroke length of each member can be made shorter or longer, depending on the thickness of the glass batch beneath each hole-producing tapered member.

It has been found further that the melting rate of the glass batch can be further enhanced of lengthening the stroke of the hole-producing tapered member so that the bottom of each such member penetrates into the body of molten glass a distance substantially equal to the thickness of the glass batch penetrated. This procedure produces a slight wave action within the molten body of glass near the inlet end of the furnace, which enhances the melting of the glass batch, but does not result in contact of the hole-producing member with molten glass. It has been further found that the process of the present invention produces a substantially uniform distribution of glass batch within the furnace.

BRIEF DESCRIPTION OF THE DRAWINGS

The invention may be more fully understood by reference to the accompanying drawings, in which:

FIG. 2 is a front elevation view of a hole-producing member useful with the batch surface modifier;

FIG. 3 is a side elevation view of one of the hole-producing members shown in FIG. 1;

FIG. 5 is a front elevation view of two adjacent batch surface modifiers of the present invention which incorporate a conical hole-producing member; and FIG. 6 is a side elevation view of FIG. 5 illustrating a mounting arrangement for the batch surface modifiers.

DETAILED DESCRIPTION OF THE INVENTION

In continuous glass furnaces, a loose granular mix of materials from which the glass is produced, commonly referred to as batch, or batch material, is introduced into one end of a melting furnace and removed as melted glass from the opposite end. There is maintained a nearly constant level of molten glass within the furnace. The specific mix of materials used will vary with the type of glass product desired. In the preparation of sodium silicate glass, silica, in the form of sand, is mixed with alkali, i.e., sodium carbonate and/or sodium hydroxide, and this mixture fed to the melting furnace. In the manufacture of soda lime glass, raw materials comprising a mixture of scrap glass or cullet, sand, limestone, soda ash, salt cake, dolomite, rouge, and the like are charged to the glass furnace. The batch feed to the glass furnace should preferably contain sufficient moisture or other liquid binding aids, e.g., caustic soda solution or sodium silicate solution, so that the compacted batch surrounding the depressions made in the surface of the batch in accordance with the invention will have sufficient self-adhesion or structural integrity to substantially maintain the depressions (potholes) intact. Batch feed of this nature is still referred to as being essentially dry.

The method and apparatus of the present invention are applicable to the manufacture of molten glass materials such as sodium silicate glass or the more commonly known soda lime glass, and is particularly useful for the preparation of sodium silicate glass. As used in the specification and claims herein, the term "glass" is intended to mean and include all types of glass manufacture for the reason that the utility of the invention is not a function of the composition of the glass.

Figure 1:
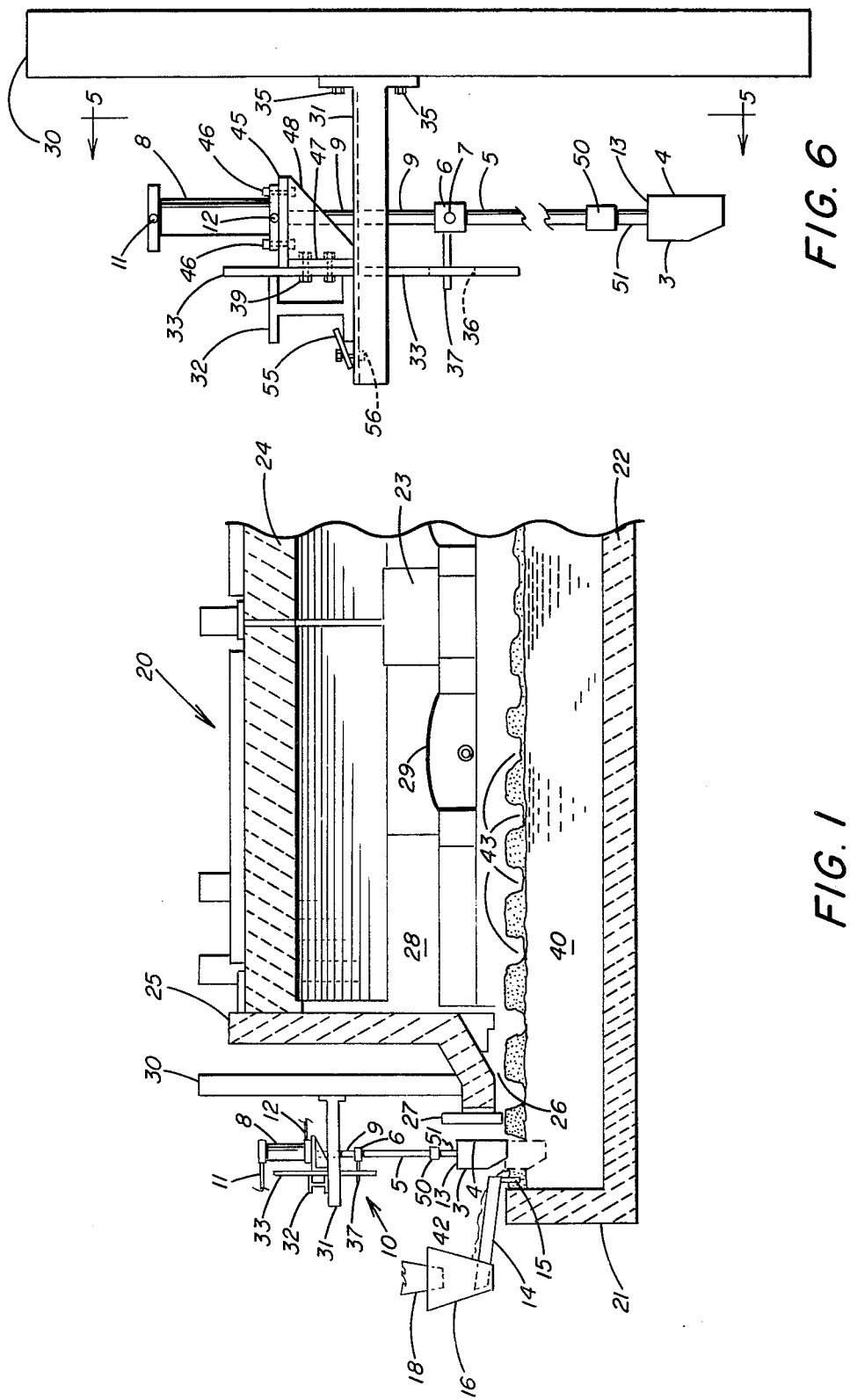
FIG. 1 is a side elevation view in section of the inlet end of a glass melting furnace incorporating the batch surface modifier of the present invention.

Referring now to the drawings, and particularly FIG. 1, there is shown for purposes of illustration the inlet end of a glass-melting furnace of the continuous tank-type generally designated by the numeral 20, which contains a molten pool of glass 40 flowing continuously from a charging end to an oppositely disposed outlet end of the tank, not shown. The rate at which the molten glass is withdrawn from the furnace governs the rate at which the glass-making materials (glass batch) are introduced into the tank, it being desired to maintain the pool of molten glass at a somewhat constant level.

The furnace 20 is defined by a floor 22, sidewall 23, roof arch 24, and end wall 25. Disposed outwardly of end wall 25 at the inlet or charging end of the furnace is a charging bay, or doghouse, which, as shown, comprises a small substantially rectangular extension of the melting chamber projecting outwardly from end wall 25 along the longitudinal axis of the furnace and defined by sidewalls 17 and 19, end wall 21, and a continuation of the furnace floor 22. The top of the doghouse is open, permitting new batch material to be deposited directly on the molten pool 40 in the doghouse.

The charging bay extension of the furnace communicates with the melting chamber of the furnace through an opening or arch 26 in wall 25. Above the body of molten glass 40 in the charging bay, arch 26 is substantially closed by a vertically suspended gate 27, which is internally cooled, e.g., by water. Gate 27 is commonly described as a "cooler" which closes off arch 26 to retard the escape of highly heated gases which are maintained at a positive pressure in the heated melting chamber 28 of the furnace. Naturally, the loss of heat or the entry of cooler air into the melting zone reduces the efficiency of furnace operation by decreasing the temperature and pressure in the melting zone below the optimum.

Adjacent to the charging bay of furnace 20 is glass batch feeder means 14 of the conventional reciprocating tray-type. Although a reciprocating tray feeder is depicted in FIG. 1, the glass batch can be fed to the furnace by means of a rotary feeder of the type shown in U.S. Pat. No. 2,829,784 or any other type of feeder useful for laying down a blanket of glass batch onto a pool of molten glass.

As shown in FIG. 1, the reciprocating tray feeder 14 is inclined toward the charging bay to permit more readily the flow of glass batch material across the tray and onto the molten pool of glass in the charging bay. Tray 14 is reciprocally mounted and mechanically connected to a conventional variable speed motor (not shown) in a manner well known in the art so as to oscillate back and forth below feeder bin 16. Above feeder bin 16 is mounted a batch bin (not shown), the bottom of which is equipped with at least one feeder chute 18, which is provided at its lower end with a closure or gate (not shown). A further gate (not shown) disposed across the width of the tray feeder regulates the thickness of the glass batch on the tray.

In the feeding operation, loose glass batch 42 from the batch bin flows through chute 18 into feeder bin 16 and is deposited on feeder tray 14. The closure or gate in the bottom of chute 18 is adjusted to permit an adequate flow of glass batch mixture into feeder bin 16 and tray 14. As the feeder tray moves forward into the charging bay, push bar 15 moves along just above the surface of the molten glass and pushes forward into the furnace the layer of glass batch material which was spread previously on the surface of the molten glass, i.e., during the previous cycle of feeder tray operation. As the feeder tray moves backwardly, a fresh charge of glass batch material is spread onto the surface of the molten glass in a manner well known in the art. In this way, a blanket of glass batch is spread continuously onto the surface of the molten glass in the charging bay and then pushed into the interior of the glass furnace.

As is conventional in melting tank furnaces of the regenerative type, the oppositely disposed upper sidewalls 23 are provided with suitably spaced burner ports 29 communicating with regenerative chambers (not shown). The interior of the furnace is maintained at regulated temperatures by heating means therein, e.g., gaseous flames produced by burners arranged in the spaced burner ports 29 by burning a fossil fuel such as oil, gas, or powdered coal in the space above the molten glass and glass batch materials so that flames pass over them, causing a transfer of heat to the contents of the furnace. Additional heat can be supplied to the molten glass in such furnaces by using submerged heaters, typically electric heaters. Also, furnaces using electric heaters alone have been described.

In accordance with the present invention and with particular reference to FIGS. 1, 4, 5, and 6, there is provided a plurality of batch surface modifiers (BSM), designated generally by the numeral 10, situated between feeder tray 14 and cooler 27. The BSM 10 is positioned so as not to interfere with feeder tray 14 when the tray is at its most forward location during feeding glass batch material to the charging bay.

The batch surface modifiers 10 are horizontally-spaced across the width of the charging bay and disposed above the glass batch therein. They are independently mounted to be vertically adjustable and are independently operable. Each includes a tapered pothole-producing member 4 provided with vertical reciprocating means for providing periodic vertical reciprocating movement to the tapered members so that they penetrate into the glass batch layer and produce a series of spaced holes 43 in the glass batch layer in the charging bay. As shown in FIGS. 1, 5, and 6, vertical reciprocation is provided by an individually operated double-acting air cylinder 8 having air inlets 11 and 12. The air inlets are connected to a source of pressurized air not shown sufficient to operate the piston of the cylinder.

The shaft 9 of air cylinder 8 is connected to coupling 6 having cooling air inlet 7. Coupling 6 provides the physical connection between shaft 9 and pipe 5, which is connected to tapered member cone 4 by means of pipe to pipe joint 50 and pipe 51. In the event tapered members 4 require replacement, they can be easily removed from the rest of the assembly by unscrewing it from pipe joint 50. Pipe 51 is welded or rigidly attached in some other conventional manner to the top 13 of member 4. As shown in FIGS. 2 and 5, pipe 51 extends into tapered member 4 and terminates near bottom plate 1. Cooling air introduced into pipe coupling 6 through inlet 7 travels downwardly through pipes 5 and 51 and joint 50, and impinges on the interior of the bottom plate 1 of tapered member 4. The cooling air travels up the sides of cone 4 and exits through four holes or orifices 2, which have been bored in the top plate 13 of cone 4 at the corners near the point where the sides and top are attached. The cone depicted in FIG. 2 is shown as having a collar 3. The cooling air is provided by a source of pressurized air (not shown), e.g., an air compressor. The pressure of this air is not critical, e.g., it can vary from 1 to about 150 pounds per square inch gauge positive pressure.

FIG. 3 illustrates a modified tapered member in which one side of the tapered member 4 is vertical. The vertical side is positioned adjacent to cooler 27 and reduces the possibility of the top of member 4 from becoming caught beneath the underside of cooler 27.

Referring now to FIG. 6, there is shown an embodiment for mounting the batch surface modifiers on the furnace. Beam 31 is shown attached in a horizontal plane to vertically disposed beam 30 by means of bolts 35. Beam 30 forms a part of the end wall frame of furnace 20. A further beam 31A (not shown) is attached similarly at the opposite side of the furnace to a beam 30A (not shown). A second beam 32 is placed across beams 31 and 31A to extend across the width of the charging bay of the furnace. Beam 32 is held in place on beam 31 and 31A by means of pressure plates 55 which are attached to beam 31 by bolts 56.

Attached in a vertical mode to the cross member of beam 32, e.g., by welding, is mounting plate 33 to which is attached plate 47, e.g., by bolts 39. The vertical alignment of plate 47 is adjustable by means of slotted bolt holes 38 in plate 47 and bolts 39 so that the depth of depression of cone 4 into the glass batch can be set accurately. Horizontally disposed plate 45 is attached to vertical plate 47 and is supported by rigid right angle support plates 48. Plates 45, 47, and 48 can be attached to one another in any convenient manner, e.g., by welding.

Each of the double-acting air-operated cylinders 8 utilized to produce the network of potholes in the glass batch in the charging bay are placed on top of horizontal plate 45 and attached thereto by means of bolts 46. The alignment of the batch surface modifiers 10 during movement is controlled by guide pin 37 in slotted hole 36 in plate 33. Guide pin 37 prevents shaft 9 and pipe 5 from turning during the reciprocating movements of the batch surface modifiers 10, and thus maintains tapered member 4 in its proper alignment.

Although a double-acting, air-operated cylinder is shown for producing vertical reciprocating movement for the batch surface modifiers 10, other vertical reciprocating means can be used. Other means for producing vertical reciprocation that can be utilized include a mechanical gear motor, hydraulic cylinder, an electrical magnetic actuator, a cam and mechanical linkage, e.g., a chain connected to a pneumatic cylinder by way of a sprocket.

In accordance with the present invention, the surface of the blanket of glass batch is imprinted with a pattern of potholes as the batch is fed into the melting furnace. The shape of the pothole can be that of an inverted pyramid, inverted truncated pyramid tetrahedron, cone, toroid, or the like. The tapered member can be fabricated from any material capable of withstanding the temperatures and environment to which it is subjected. The tapered members 4 can be fabricated from metal, e.g., stainless steel, mild steel, porcelain-coated steel, because they are internally air cooled. Other coolants for the tapered members such as water can be used instead of air, but air is preferred.

The primary purpose of generating a potholed surface in the glass batch is to provide sloping surfaces for melted glass to run off the dry glass batch into the body of molten glass below and expose the underlying, unmelted batch. Although surface area available for heat transfer to the glass batch is an important parameter for determining the rate of melting, the area available for run-off of the thin melted layer of glass on the surface of the glass batch is even more important. Thus, the present invention enhances the run-off of liquified batch from the unmelted batch layer so as to improve the overall melting rate. This is accomplished by providing compacted, sloped surfaces on the batch layer on the upper surface of the batch blanket. The present invention further permits contouring of the batch blanket in the manner described without increasing the thickness of portions of the batch layer and without requiring a reduction in the mass throughput of the furnace.

Tapered members 4 force the batch aside during its downward movement therein and compact the batch around each hole being made as the member is lowered into the batch blanket. In addition, a portion of the batch beneath the bottom plate 1 is compacted and pushed downwardly into and substantially below the body of molten glass, i.e., the bottom of tapered members 4 extend into the molten glass a distance about equal to the thickness of the batch blanket below the tapered member. In doing so, the batch beneath the bottom plate is compacted and forced into the body of molten glass. The glass batch surrounding the bottom plate insulates the tapered member and prevents it from coming into direct contact with the highly corrosive molten glass and further prevents the molten glass from sticking to the member. In a typical glass-melting operation, the batch blanket is about 4 to 6 inches thick and, consequently, in accordance with the present invention, tapered member 4 is extended during its downward stroke a distance sufficient to move the bottom plate of the tapered member from 4 to 6 inches below the liquid level of the molten glass. The batch, which is compacted and pushed downwardly by the blunt tip of tapered member 4, springs back due to the bouyant effect of the molten glass beneath it after the tapered member is withdrawn from the batch and returned to its original starting position. It has been observed, however, that the compacted bottom portion of the batch, i.e., the portion below bottom plate 1, melts more quickly than the adjoining batch, thereby leaving an open bottom hole through the batch layer in communication with the molten glass beneath and providing a readily available drain for liquified batch to run off from the top of the batch layer.

The slope of the side of the tapered member 4 is selected as a trade-off between compaction and ease of penetration. A relatively flat angle between the opposite sides of each tapered member maximizes the compacting effect on the batch, but increases the amount of force required to penetrate the batch layer. Conversely, a narrow included angle between the opposite sides of the tapered member optimizes ease of penetration but yields little compaction in the batch. Moreover, the hole produced by such a member may not be sufficiently large to facilitate run-off of the thin layer of melted glass and may fill up with adjacent batch. Accordingly, it is preferred that the included angle between the opposite sides of each tapered member be at least 30°, e.g., from 30° to 90°. Thus, the holes produced would have sloping sides 15° to 45° from the vertical.

The number of potholes produced in the batch blanket are preferably maximized in order to optimize the rate at which the glass batch is melted. While even a few holes produced in the batch layer provides an improvement in the melting rate, it is preferred to provide a plurality of potholes of the nature described to optimize the melting rate. An upper limit on the number of potholes is reached when the spacing between the holes is reduced to the point where compaction cannot wholly account for displacement of batch from the holes. In that case, batch is forced into higher mounds around the holes or previously made holes are caused to collapse due to horizontal displacement of the glass batch.

Figure 4:
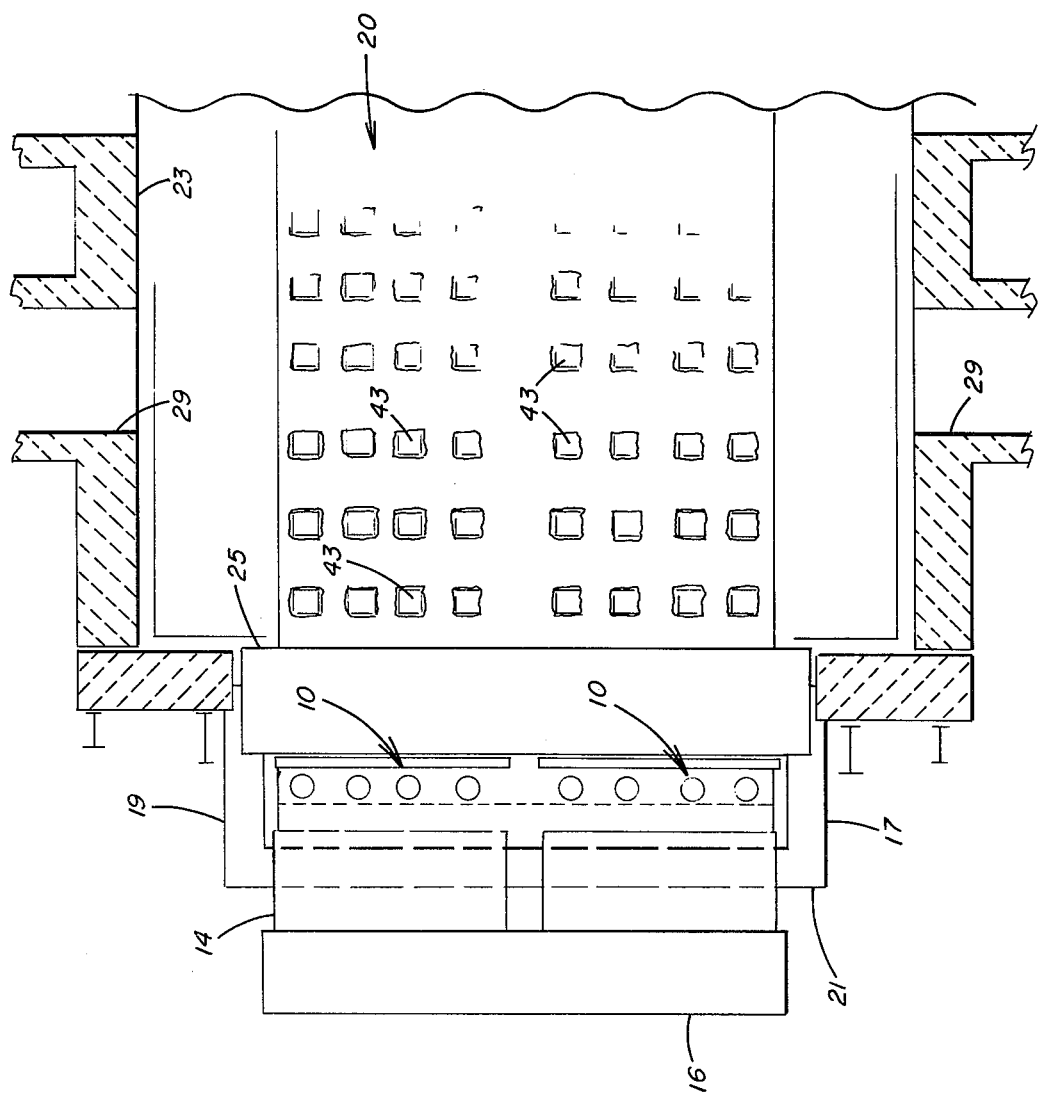
FIG. 4 is a top plan view of the inlet end of the glass melting furnace of FIG. 1.

As shown in FIG. 4, a total of eight hole-producing tapered members are illustrated. As described heretofore, the number of hole-producing members can vary and will depend on the size of the charging bay and the size of the hole-producing members. Typically, they will be uniformly spaced across the width of the charging bay. The potholes can be spaced similarly in both directions. When a plurality of holes are made across the width of the batch blanket, as in the embodiment described herein, spacing in the longitudinal direction need not be as great as in the transverse direction. In one embodiment, longitudinal spacing of the potholes is such that there is a slight overlap of the potholes produced, i.e., a furrow effect is created in the longitudinal direction. Spacing of the holes longitudinally in the batch blanket is controlled by timing the insertion of the tapered members. In a further embodiment, the tapered members are stroked periodically near or at the end of the backstroke of the feeder tray, i.e., as the feeder tray moves backwardly to its starting position, and no more often than every other feeder stroke. The BSM is operated every third or fourth cycle of the tray feeder.

The present invention is more particularly described in the following Examples, which are intended as illustrative only since numerous modifications and variations therein will be apparent to those skilled in the art.

EXAMPLE I

A conventional glass melting furnace producing sodium silicate glass at a rate of approximately 260 tons per day was retrofitted with eight pothole-generating batch surface modifiers, as shown in FIGS. 1 and 4. The eight tapered members 4 were spaced substantially equally (about 18 inches apart, center-to-center) in a transverse direction across the approximately 14-foot wide charging bay (doghouse) of the furnace extension. The tapered members 4 were 6 inches square at their base and 12 inches by 9 inches at their top with a 6-inch collar and were sloped from the base of the collar to the base of the tapered member on three sides. The tapered members were similar to that depicted in FIGS. 3 and 6 with the vertical portion of the member positioned in the doghouse adjacent to the water-cooled gate 27 to avoid interference between the member 4 and the water-cooled gate 27 during vertical reciprocation. This modification to the tapered member of FIG. 2 was necessitated because of the limited area available in the furnace between the water-cooled gate 27 and the feeder tray at its most forward position.

Tapered members 4 were each connected to the shaft of a double-acting air cylinder having a 16-inch stroke by means of shaft-to-pipe coupling 6, pipe 5, coupling 50, and pipe 51. The base of the tapered members 4 was positioned approximately four to six inches above the surface of the glass batch blanket floating atop the body of molten glass in the charging bay. The vertical movement of the BSM was guided by guide pin 37 in shaft guide 37. The air cylinders were connected to a common source of pressurized air, not shown, capable of generating 50 to 70 pounds air pressure. The cooling air inlets in couplings 6 were connected to a common source of pressurized air, e.g., an air compressor.

The air cylinders were stroked (thus projecting the tapered members into the glass batch and molten pool) simultaneously every second cycle of the feeder tray and while the feeder tray was at its most rearward position. In practice, a limit switch was connected to the feeder tray, which switch was operatively connected to a relay which initiated a count on a counter in order to control the frequency of the downstroke and upstroke of the tapered member. The counter, in turn, was operatively connected to a timer to control the length of the downstroke and the timer connected to solenoid valve, which provided air to the air cylinder. In this example, the air cylinder was stroked once for four seconds every two strokes of the feeder tray when the feeder tray was at the end of the backstroke in order to avoid fresh batch from falling into the depression formed by the downward movement of tapered member. At the end of the downstroke, air pressure to inlet 11 was cut off and the air pressure applied to inlet 12, thereby causing withdrawal of the tapered member to its original position.

The glass melting furnace was natural gas fired and the temperatures within the furnace were monitored by thermocouples positioned at various locations longitudinally along the crown of the furnace. A temperature of 2850° F. for the thermocouple nearest the molten glass discharge end of the furnace was selected as the standard. In this Example, the natural gas feed rate was set at 80,000 standard cubic feet/hour (SCFH) on the gas controller. With the batch surface modifier in operation, the glass batch feed rate was adjusted to maintain the aforesaid thermocouple at 2850° F. After temperatures and glass batch feed rate had stabilized for several hours, the batch surface modifier unit was turned off and the gas flow rate was increased to maintain the thermocouple in the crown at 2850° F. No change in the glass batch feed rate was made to assure a constant furnace production rate. The natural gas fuel rate was increased to 93,000 SCFH on the natural gas controller to maintain the thermocouple temperature in order to assure complete melting of the glass batch at this particular (constant) furnace production rate. This equated to a 14.0 percent fuel savings when the batch surface modifier unit was in operation.

EXAMPLE II

The procedure and apparatus of Example I were utilized. In this Example, the natural gas flow rate was set at 70,000 SCFH on the gas controller with the batch surface modifier unit in operation. The batch surface modifier unit was turned off after temperatures and feed rate had stabilized, and it was found necessary to increase the gas flow rate to 83,000 SCFH to maintain the standard thermocouple at 2850° F. This equated to a 15.7 percent savings of fuel.

EXAMPLE III

The procedure and apparatus of Example I were used except that the natural gas flow rate was set at 83,000 SCFH on the gas controller with the batch surface modifier unit off. The glass batch feed rate was adjusted to maintain the standard thermocouple at 2850° F. After temperatures and the batch feed rate had stabilized for several hours, the batch surface modifier unit was turned on and the natural gas flow rate decreased to hold the standard thermocouple constant at 2850° F. It was found that the gas fuel rate could be decreased to 74,000 SCFH with the batch surface modifier unit on. This equated to a 10.8 percent fuel savings.

EXAMPLE IV

The procedure and apparatus of Example III were used except that the natural gas flow rate was set at 90,000 SCFH on the gas controller with the batch surface modifier unit off. The aforesaid unit was switched on after temperatures and the glass batch feed rate had stabilized, and it was found that it was necessary to decrease the gas flow rate to 81,000 SCFH. This equated to a 10.0 percent fuel savings.

The average gas savings for Examples I–IV equalled 12.6 percent. The data of such examples illustrates the dramatic effect the batch surface modifier unit has on energy savings. Conversely, the amount of energy utilized can remain constant while increasing the glass batch feed rate to increase the production rate of the furnace. With the batch surface modifier unit in operation, it was observed that glass batch substantially covered the entire surface of molten glass within the furnace (to the point where all of the glass batch was melted), and broke up readily into logs; whereas, with the batch surface modifier off, it was observed that there was an open V-shaped area within the center of the glass furnace that was not covered with glass batch—the batch moving to each side of the furnace in a direction to intersect the sidewalls of the furnace. Thus, it was found that the present invention also enhances log formation and produces improved coverage of the batch on the surface of the molten glass.

Although the present process has been described with reference to specific details of certain embodiments thereof, it is not intended that such details should be regarded as limitations upon the scope of the invention except as and to the extend that they are included in the accompanying claims.

I claim:

1. In the method of producing glass by heating glass batch material in a glass furnace wherein granular glass batch material is introduced onto the surface of a pool of molten glass contained by the furnace and wherein the glass batch is fed into said furnace and floats on the surface of said pool until rendered liquid by heating means within the furnace, the improvement which comprises enhancing the melting rate of the batch material by:

(a) establishing a blanket of glass batch material on the surface of the pool of molten glass at the charging end of the furnace;
   (b) providing a plurality of vertically adjustable independently mounted and independently operable tapered pothole-producing members spaced horizontally across the width of the charging end of the furnace and disposed above the glass batch blanket;
   (c) adjusting the height of each tapered member above the glass batch blanket so that when lowered the bottom of the tapered members will extend into and below the molten glass a distance about equal to the thickness of the glass batch blanket beneath each member;
   (d) lowering the tapered members periodically into the batch blanket and molten glass pool, thereby producing a plurality of potholes in the blanket;
   (e) withdrawing the tapered members from the glass batch; and
   (f) feeding said pothole-containing glass batch into the interior of the furnace.

2. The method of claim 1 wherein the blanket of glass batch is established by a reciprocating tray type feeder.

3. The method of claim 2 wherein the tapered members are lowered into the glass batch not more often than every other feeder stroke.

4. The method of claims 1 or 2 wherein the lowering of the tapered members produces a furrow effect in the glass batch in a longitudinal direction.

5. The method of claims 1 or 2 wherein the glass produced is sodium silicate glass.

6. In an apparatus for the manufacture of glass including a glass melting furnace having a heated melting chamber for containing a pool of molten glass, a charging bay extension of the furnace which communicates with the heated melting chamber, glass batch feeder means for feeding a blanket of granular glass batch material onto the surface of the molten pool of glass in the charging bay, a plurality of vertically adjustable, independently mounted and independently operable tapered pothole-producing members spaced horizontally across the width of the charging bay and disposed above the glass batch in the charging bay, vertical reciprocating means for providing vertical reciprocating movement to the tapered members periodically so that the bottom of each such member penetrates into and below the surface of the molten glass a distance about equal to the thickness of the glass batch blanket beneath each such tapered member during its downward movement, mounting means for mounting said tapered pothole-producing members and vertical reciprocating means above the charging bay; and means for cooling the tapered members.

7. The apparatus of claim 6 wherein the feeder means is a reciprocal tray type feeder.

8. The apparatus of claims 6 or 7 wherein the vertical reciprocating means is a double-acting air cylinder.

9. The apparatus of claim 8 wherein the tapered member is an inverted truncated pyramid.

10. The apparatus of claim 9 wherein the truncated pyramid has a collar at its upper end.

11. The apparatus of claim 6 wherein the tapered members are air cooled.

* * * * *